United States Patent Office 3,829,381
Patented Aug. 13, 1974

3,829,381
BORON- AND CALCIUM-CONTAINING
COMPOSITIONS AND PROCESS
William Monroe Le Suer, Cleveland, Ohio, assignor to
The Lubrizol Corporation, Wickliffe, Ohio
No Drawing. Filed Feb. 2, 1970, Ser. No. 8,005
Int. Cl. C10m *1/40*
U.S. Cl. 252—33.4                1 Claim

ABSTRACT OF THE DISCLOSURE

Boron- and calcium-containing compositions useful as lubricant and fuel additives are prepared by reacting boric acid with certain carbonated, calcium overbased petrosulfonates.

This invention relates to novel, metal-containing compositions. More particularly, this invention is concerned with boron- and calcium-containing compositions useful as additives in lubricants and fuels.

As is well-known, overbased organic acids are used extensively as additives in lubricants and fuels where they function as detergents, smoke-suppressants, and the like. Typical processes for preparing these overbased organic acids and detailed descriptions of their use are found in commonly assigned U.S. Pats. 2,616,905; 2,695,910; 2,723,235; 3,313,618; 3,350,308; 3,437,465, 3,471,403; 3,488,284; etc.

It has now been determined that certain calcium overbased sulfonic acids can be post-treated with boric acid to improve the rust resistant capabilities of lubricants and fuels containing these sulfonates. More particularly, it has been determined that carbonate, calcium overbased petrosulfonic acids characterized by a metal ratio of about twelve can be post-treated with boric acid to improve the rust-resistance of lubricants and fuels containing these post-treated products.

Accordingly, it is a principal object of this invention to provide novel boron- and calcium-containing compositions. Another object of this invention is to provide novel boron- and calcium-containing compositions useful as additives in lubricants and fuels. A further object is to provide a process for preparing the boron- and calcium-containing compositions of this invention.

These and other objects of this invention are achieved by providing homogeneous, clear filterable boron- and calcium-containing reaction products which are soluble in nonpolar organic liquids and which can be prepared by the process comprising contacting boric acid with a carbonated, calcium overbased petrosulfonic acid characterized by a metal ratio of about twelve at a temperature of about 125° C. to about 175° C., the total amount of boric acid employed being from about 10% to about 20% by weight based on the weight of said carbonated, calcium overbased petrosulfonic acid.

The novel boron- and calcium-containing compositions of this invention can be prepared according to the following examples. Unless otherwise indicated, all references to percentages and parts are intended to refer to percent by weight and parts by weight unless otherwise indicated.

EXAMPLE 1

(a) A mixture consisting essentially of 480 parts of a sodium petrosulfonate (average molecular weight of about 480), 84 parts of water, and 520 parts of mineral oil is heated at 100° C. for four hours. The mixture is then heated with 86 parts of a 76% aqueous solution of calcium chloride and 72 parts of lime (90% purity) at 100° C. for two hours, dehydrated by heating to a water content of less than about 0.5%, cooled to 50° C., mixed with 130 parts of methyl alcohol, and then blown with carbon dioxide at 50° C. until substantially neutral. The mixture is then heated to 150° C. to distill off methyl alcohol and water and the resulting oil solution of the basic calcium sulfonate filtered. The filtrate is found to have a calcium sulfate ash content of 16% and a metal ratio of 2.5. A mixture of 1305 parts of the above carbonated calcium petrosulfonate, 930 parts of mineral oil, 220 parts of methyl alcohol, 72 parts of isobutyl alcohol, and 38 parts of amyl alcohol is prepared, heated to 35° C., and subjected to the following operating cycle four times: mixing with 143 parts of 90% commercial calcium hydroxide (90% calcium hydroxide) and treating the mixture with carbon dioxide until it has a base number of 32–39. The resulting product is then heated to 155° C. during a period of nine hours to remove the alcohol and filtered at this temperature. The filtrate is characterized by a calcium sulfate ash content of about 40% and a metal ratio of about 12.2.

The term "metal ratio" is used herein to designate the ratio of total chemical equivalents of the calcium in the carbonated, calcium overbased petrosulfonic acid salt to the chemical equivalents of calcium in a normal calcium petrosulfonate, i.e., a neutral calcium salt of a petrosulfonic acid. To illustrate, a carbonated, calcium overbased petrosulfonic acid salt containing five equivalents of calcium per equivalent of petrosulfonic acid has a metal ratio of five and a neutral calcium pertosulfonate has a metal ratio of one.

(b) The filtrate of (a) is adjusted to a total mineral oil content of about 50%. Then, 1500 parts of the resulting oil solution is heated to 150° C. and 75 parts of boric acid ($H_3BO_3$) is added thereto over a one-hour period. The mixture is then heated at 160°–165° C. for five hours and then filtered. The filtrate is the desired boron- and calcium-containing composition of this invention. The filtrate is characterized by a sulfate ash content of 40.2%, a boron content of 0.59%, a calcium content of 11.5%, and a sulphur content of 1.6%.

(c) 3000 parts of the filtrate of (a) adjusted to a mineral oil content of about 50% is heated to 125° C. and thereafter 300 parts of boric acid are added over a 1.5 hour period while maintaining a temperature at about 125° C. Upon completion of the addition of boric acid, the resulting mixture is heated to 160° C. over a one-half hour period, held at about 160° C. for four hours and thereafter filtered. The filtrate is an oil-solution of the desired boron- and calcium-containing composition of this invention. It is characterized by a sulfate ash content of 40.3%, a boron content of 1.48%, and a sulphur content of 1.45%.

If desired, the boron- and calcium-containing composition can be isolated from the oil solution by mixing the filtrate with acetone in a volumetric ratio of filtrate to acetone of about 1 to 1.5 to 1 to 3. This causes the boron- and calcium-containing material to precipitate. It is then readily recovered by conventional techniques, that is, filtering, drying, etc. Likewise, xylene can be substituted for the mineral oil used in the above example. In this manner, the boron- and calcium-containing composition can be isolated simply by evaporating the xylene from the final filtrate. By either process, a solid composition is produced which can be added directly to a fuel or lubricant. Generally it is desirable to either powder this solid before adding it to a fuel or lubricant or to redisperse it in a nonpolar organic liquid such as mineral oil or a normally liquid hydrocarbons such as a cycloaliphatic; or aromatic hydrocarbon (e.g., cyclohexane, heptane, xylene).

The precise nature of the mechanism by which the boric acid is incorporated into the carbonated, calcium overbased petrosulfonic acid is not understood. Likewise, the manner by which rust resisting properties are improved in lubricants and fuels containing these novel boron- and calcium-containing reaction products is not known. However, it is apparent that some type of reaction takes place between the boric acid and the carbonated, calcium overbased petrosulfonic acid since the basic acid is consumed in the reaction process. Furthermore, the exact nature of the reaction products is not known so that it is necessary to describe them in terms of the process by which they are produced.

The novel boron- and calcium-containing compositions of this invention can be utilized in lubricant compositions in the same manner as known calcium overbased petrosulfonic acid detergents are used. For example, they can be incorporated into crankcase lubricants in amounts such that they constitute from about 0.1% to about 10% by weight, usually 0.5% to 5% by weight, of the total weight of the lubricating oil composition. In furnace fuels, jet engine fuels, diesel fuels and other normally liquid petroleum distillate fuels where they function as antiscreen clogging agents, detergents, and smoke-suppressants, the boron- and calcium-containing compositions of this invention will be employed in amounts such that they comprise from about 0.0001% to about 2% by weight of the total fuel composition. When employed as an anti-screen clogging agent, the amount will generally be about 0.0001% to about 0.1%. As a smoke suppressant, the amount will generally be from about 0.1% to about 1% although larger amounts can be utilized for either purpose.

In a Falcon engine test used to evaluate rust resistance of crankcase lubricating oil composition, two lubricating oil compositions were evaluated under the same conditions. The only difference in the two lubricating oil compositions was that one contained the carbonated, calcium overbased petrosulfonate of Example 1(a) and the other contained an equivalent amount of the boron- and calcium-containing composition of 1(c). On a rating scale of 1 to 10, 10 being no rust, the lubricating oil composition containing the product 1(a) produced an average engine rust rating of 8.6 while the lubricating composition of 1(c) produced an average engine rust rating of 9.1.

What is claimed is:

1. A homogeneous, clear, filterable boron- and calcium-containing reaction product, capable of being separated from the mineral oil reaction medium in which it is produced, which is soluble in nonpolar organic liquids and which is prepared by the process comprising contacting boric acid with a carbonated calcium overbased petrosulfonic acid characterized by a metal ratio of about twelve at a temperature of about 125° C. to about 175° C. in a mineral oil reaction medium, the total amount of boric acid employed being from about 10% to about 20% by weight based on the weight of said overbased, petrosulfonic acid.

References Cited

UNITED STATES PATENTS

| | | | |
|---|---|---|---|
| 3,242,079 | 3/1966 | McMillen | 252—18 |
| 3,254,025 | 5/1966 | Le Suer | 252—18 |
| 3,480,548 | 11/1969 | Hellmuth et al. | 252—33.4 |

DANIEL E. WYMAN, Primary Examiner

I. VAUGHN, Assistant Examiner

U.S. Cl. X.R.

44—51, 76; 252—33, 389